United States Patent
Reudink et al.

(10) Patent No.: US 9,730,192 B1
(45) Date of Patent: Aug. 8, 2017

(54) SYSTEM AND METHOD FOR STACKING RECEIVER CHANNELS FOR INCREASED SYSTEM THROUGH-PUT IN AN RF DATA TRANSMISSION SYSTEM

(71) Applicant: NETGEAR, Inc., San Jose, CA (US)

(72) Inventors: Mark D. Reudink, Seattle, WA (US); Lee David Dunbar, Bothell, WA (US); Bruce C. Rothaar, Woodinville, WA (US)

(73) Assignee: NETGEAR, Inc., San Jose, CA (US)

( * ) Notice: Subject to any disclaimer, the term of this patent is extended or adjusted under 35 U.S.C. 154(b) by 46 days.

(21) Appl. No.: 13/945,663

(22) Filed: Jul. 18, 2013

Related U.S. Application Data

(63) Continuation of application No. 09/962,845, filed on Sep. 25, 2001, now Pat. No. 8,494,063.

(51) Int. Cl.
H04W 72/04 (2009.01)
H04B 15/00 (2006.01)
H04B 17/30 (2015.01)

(52) U.S. Cl.
CPC ......... H04W 72/0406 (2013.01); H04B 15/00 (2013.01); H04B 17/30 (2015.01)

(58) Field of Classification Search
CPC ... H04W 72/0406; H04B 17/00; H04B 15/00; H04B 17/24; H04B 17/309; H04B 17/30
See application file for complete search history.

(56) References Cited

U.S. PATENT DOCUMENTS

| | | | |
|---|---|---|---|
| 4,633,509 A * | 12/1986 | Scheinert | 455/434 |
| 4,891,806 A | 1/1990 | Farias et al. | |
| 4,991,184 A | 2/1991 | Hashimoto | |
| 5,235,598 A * | 8/1993 | Sasuta | 370/327 |
| 5,239,678 A * | 8/1993 | Grube et al. | 455/511 |
| 5,377,193 A * | 12/1994 | Grube et al. | 370/315 |
| 5,398,258 A * | 3/1995 | Su | H03M 5/145 |
| | | | 370/277 |
| 5,442,809 A * | 8/1995 | Diaz et al. | 455/511 |
| 5,541,955 A | 7/1996 | Jacobsmeyer | |
| 5,592,469 A | 1/1997 | Szabo | |
| 5,608,755 A * | 3/1997 | Rakib | 375/219 |
| 5,757,779 A | 5/1998 | Young et al. | |
| 5,764,699 A * | 6/1998 | Needham et al. | 375/261 |
| 5,764,918 A | 6/1998 | Poulter | |
| 5,778,318 A * | 7/1998 | Talarmo et al. | 455/452.1 |
| 5,940,439 A | 8/1999 | Kleider et al. | |
| 5,982,813 A | 11/1999 | Dutta et al. | |
| 5,987,322 A | 11/1999 | Gupta et al. | |
| 5,995,536 A | 11/1999 | Arkhipkin et al. | |

(Continued)

Primary Examiner — Jean B Corrielus
(74) Attorney, Agent, or Firm — Norton Rose Fulbright US LLP

(57) ABSTRACT

A wireless RF data transmission system has at least one base station transmitting control information on a control channel and high speed data on at least one data channel. At least one subscriber station receives the control information and data channels, adjusting a modulation and/or coding of reception of the data in response to the control information. Preferably, the control information is transmitted using a more robust modulation, such as QPSK, than used to transmit the data, which is preferably transmitted using either 16, 64 or 256 QAM. Additionally, timing or header information for the data may be included on the control channel.

26 Claims, 2 Drawing Sheets

(56) References Cited

U.S. PATENT DOCUMENTS

| | | | |
|---|---|---|---|
| 6,031,827 A | 2/2000 | Rikkinen et al. | |
| 6,061,549 A | 5/2000 | Labonte et al. | |
| 6,072,795 A | 6/2000 | Poulter | |
| 6,094,576 A * | 7/2000 | Hakkinen | H04W 52/08 370/252 |
| 6,097,957 A * | 8/2000 | Bonta et al. | 455/446 |
| 6,108,322 A * | 8/2000 | Kotzin et al. | 370/333 |
| 6,128,507 A * | 10/2000 | Takai | H04W 24/00 455/411 |
| 6,151,484 A | 11/2000 | Ramesh | |
| 6,175,550 B1 | 1/2001 | van Nee | |
| 6,198,734 B1 | 3/2001 | Edwards et al. | |
| 6,262,998 B1 | 7/2001 | Hogeboom | |
| 6,330,278 B1 | 12/2001 | Masters et al. | |
| 6,374,117 B1 | 4/2002 | Denkert et al. | |
| 6,389,066 B1 | 5/2002 | Ejzak | |
| 6,430,396 B1 | 8/2002 | Bamburak et al. | |
| 6,456,627 B1 | 9/2002 | Frodigh et al. | |
| 6,459,690 B1 * | 10/2002 | Le Strat et al. | 370/332 |
| 6,539,205 B1 * | 3/2003 | Wan et al. | 370/465 |
| 6,598,200 B1 | 7/2003 | Greenwood et al. | |
| 6,728,228 B1 | 4/2004 | Ostman et al. | |
| 6,748,021 B1 | 6/2004 | Daly | |
| 6,782,046 B1 | 8/2004 | Ling et al. | |
| 6,782,066 B1 | 8/2004 | Nicholas et al. | |
| 6,829,307 B1 | 12/2004 | Hoo et al. | |
| 6,865,233 B1 | 3/2005 | Eriksson et al. | |
| 6,920,128 B1 | 7/2005 | Haugli et al. | |
| 6,952,439 B1 | 10/2005 | Lindsey et al. | |
| 7,020,185 B1 | 3/2006 | Balachandran et al. | |
| 2002/0101913 A1 | 8/2002 | Masters et al. | |
| 2004/0009792 A1 * | 1/2004 | Weigand | H04L 12/2602 455/561 |
| 2009/0285172 A1 * | 11/2009 | Hansen | H04W 16/10 370/329 |

* cited by examiner

SYSTEM AND METHOD FOR STACKING RECEIVER CHANNELS FOR INCREASED SYSTEM THROUGH-PUT IN AN RF DATA TRANSMISSION SYSTEM

The present application is a continuation of patent application Ser. No. 09/962,845 entitled "SYSTEM AND METHOD FOR STACKING RECEIVER CHANNELS FOR INCREASED SYSTEM THROUGH-PUT IN AN RF DATA TRANSMISSION SYSTEM," filed Sep. 25, 2001 and issued Jul. 23, 2013 as U.S. Pat. No. 8,494,063, the disclosure of which is hereby incorporated herein by reference.

TECHNICAL FIELD

Background

Currently, there are several so-called "last mile" and "last foot" data transmission systems which are designed to deliver high speed and/or high data capacity from the internet backbone to an end user. Several such systems use RF transmissions to replace copper wire or fiber optic cables. Some of these systems are called point-to-point or point-to-multipoint systems and operate in various licensed and unlicensed RF bands. A fundamental characteristic of many such existing systems is that their RF transmissions occur in a frequency spectrum protected and regulated by a government body. These protected frequency spectrums, or bands, are licensed to certain license holders and only a few may operate in any given physical area depending upon the number of licenses available.

There are only a limited number of licensed bands in any geographic area, thus, in order to widen the choices consumers have, it is desirable for service providers to be able to use unlicensed RF bands to provide high speed, high capacity data services. In addition, a service provider may not hold licenses in every geographic area that it desires to provide service. Therefore, use of the unlicensed frequency bands may allow a service provider to cover a greater geographical area.

In 1997 the FCC created a wireless arena called Unlicensed National Information Infrastructure (U-NII). System operators are free to operate wireless equipment in three sub-bands (5.15 to 5.25 GHz, 5.25 to 5.35 GHz and 5.725 to 5.825 GHz) without acquiring a licensed frequency spectrum. The FCC specifies the conditions for operating wireless equipment in the U-NII frequency band. However, operators are not protected from possible interference from other U-NII operators transmitting in the vicinity or even other systems or devices which utilize the same frequencies.

The IEEE, a standards group, is defining a wireless LAN standard, referred to as IEEE 802.11a for operation in the U-NII band. Equipment that conforms to this standard will operate indoors at the lower and middle frequency sub-bands (i.e. 5.15 to 5.25 GHz and 5.25 to 5.35 GHz). The ETSI BRAN group in Europe has defined an air interface standard for high-speed wireless LAN equipment that may operate in the U-NII frequency bands. Equipment that is compatible with this standard may cause interference with use of these unlicensed bands.

A problem that many operators face in the unlicensed bands is a need to provide the highest possible data rates to subscriber units. One prior art method of providing greater through-put in licensed bands is to have a very large channel bandwidth providing data to the subscriber. To increase through-put to a particular subscriber unit, the bandwidth must necessarily increase or the modulation scheme that is used has to become more complicated. Problematically, bandwidth is limited in the unlicensed bands and using a higher modulation scheme causes an increase in the necessary signal to noise ratio or carrier to interference ratio (C/I). For example, increasing from a quadrature phase shift keying (QPSK) modulation to a 16 quadrature-amplitude modulation (16QAM), which doubles the throughput, requires a 6 dB increase in C/I. Problematically, such increases in C/I may not be practical, particularly in the unlicensed bands where a significant amount of interference may be present.

Another problem associated with increasing the capacity or through-put of a RF wireless data transmission system can be the limited amount or type of hardware available to build a point-to-multipoint wireless data transmission system. For example, some chip sets are only available with a 6 Mhz channel bandwidth. This limits capacity to what can move through a 6 Mhz channel bandwidth. Likewise, to use a wider bandwidth channel, which would increase capacity, a desired modulation scheme might not be feasible, due to complications and costs in designing a system without the benefit of off-the-shelf chips.

Multiple input multiple output (MIMO) systems divide a single channel into different transmit streams, but use multiple antennas that are at the same base station location. Code division multiple access (CDMA) systems use multiple transmit codes from different base stations, using the same frequency. The global system for global communications (GSM) system combines multiple timeslots from a single frequency to increase capacity using a single antenna. Therefore, it is desirable for a wireless RF data communication system to use multiple frequencies to increase capacity.

BRIEF SUMMARY

The present invention is directed to a system and method for stacking receiver channels to increase through-put in a wireless RF data transmission system. To accommodate narrower bandwidths, while increasing the through-put to a particular subscriber unit, a plurality of channels are used to transmit from a hub to the particular subscriber. The plurality of channels do not necessarily have to be adjacent in the frequency spectrum, easing frequency planning and interference avoidance scheme constraints. The plurality of channels are transmitted simultaneously to the subscriber. The channels can either be transmitted through a single antenna using a combining network, or through multiple antennas that are pointed in the direction of the subscriber. The antennas that are used do not necessarily have to have the same polarization, or be collocated. For example, a subscriber with a wide antenna beam width, or if the subscriber has multiple narrow beam antennas, can communicate with multiple hub sites simultaneously, thereby having a plurality of independent signal paths reaching the subscriber unit. These two paths can then be combined at the receiver. If the same modulation scheme is used on both channels, the data rate is effectively doubled for that particular subscriber unit.

However, one of the advantages of a preferred embodiment of the present invention is an ability to use a robust modulation scheme on one channel, and a higher capacity modulation scheme, that requires a higher C/I, on the other channel. The channels are used simultaneously, so the more robust control channel can communicate to the second receiver the type of modulation to be used for the high capacity channel. In the prior art changing the modulation scheme of a data channel required a bursty receiver, which is a more complicated design than a continuous receiver. For a single channel, a modulation change from, for example QPSK to 16QAM, requires that the receiver reacquire the signal. However, in the present invention, the second channel may only utilize a higher modulation scheme such as 16QAM or 64QAM. Alternatively, the second channel may use reduced channel coding with the same modulation which also increases data throughput. Preferably, when a change in modulation is necessary, the more robust channel, the control channel, prepares the receiver prior to the change of modulation for the second channel. The second channel does not have to reacquire the signal, because it is prepared for the switch to a higher modulation by the control channel.

As the modulation and/or transmission coding scheme changes depending on channel conditions, the control channel alerts the subscriber receiver to the modulation and coding system to be used. Additionally, while the subscriber unit is not receiving data, it can monitor conditions of a channel and alert the hub that it is capable of receiving a very high modulation or complex modulation scheme on the non-control, data channel. The hub may then convey a message via the control channel that the hub will use such a modulation and prepare the subscriber unit to receive at the higher modulation. As the channel conditions change due to fading or due to interference that arises in the network, the modulation scheme that is used on the data channel may change. The robust control channel may also experience excessive interference. When this occurs the control channel modulation can be lowered to an even more robust modulation. Thereby, two degrees of freedom for communication to the subscriber are allowed by the preset system, which provides a very versatile system. Also, if there is a failure in the system resulting in loss of one channel or if interference on one of the channels becomes unacceptably high, the system can continue to communicate via the remaining channel, albeit at a lower data transfer rate.

Advantageously, using narrower bandwidth channels rather than higher bandwidth channels to communicate with users, gives a frequency planner more flexibility in the design of a network, and gives the system more flexibility in mitigating any interference that might arise. For example, if interference occurs on one of the two channels that is being transmitted to the user, there are more narrow band channels available for the hub to select from for future transmissions. The present system is well adapted for use in a frequency duplex system, a time duplex system, a time division duplexing (TDD) system or other similar duplexing or multiplexing systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
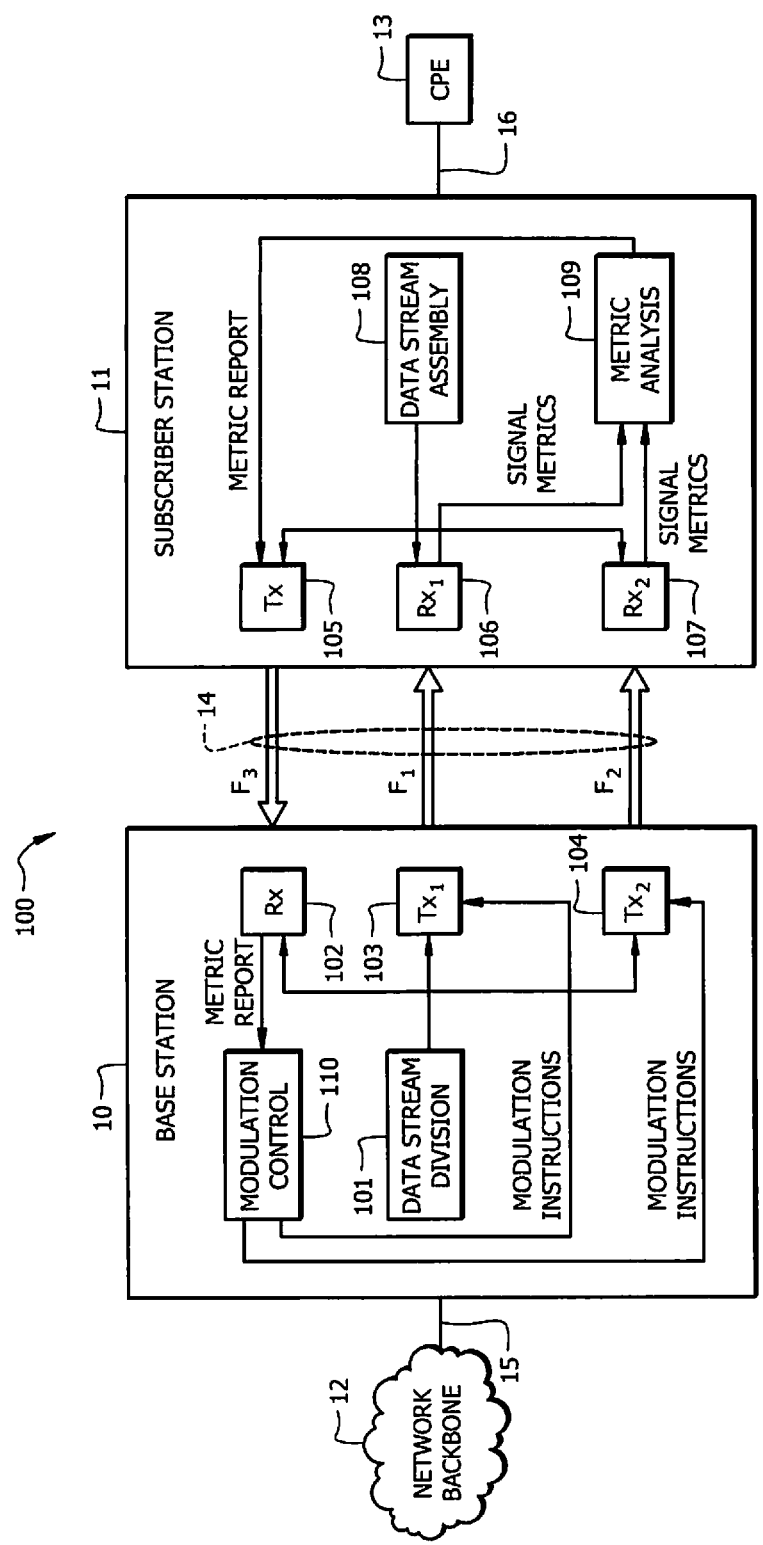
FIG. 1 is a diagrammatic illustration of the present system and method for stacking receiver channels in an RF data transmission system.

FIG. 1 shows system 100, which provides a data communication connection between hub base station 10 and subscriber station 11. In this system, the connection between base 10 and subscriber 11 is through RF transmission medium 14, preferably employing channels F1, F2 and F3. The illustrated base station has two transmitters, 103 and 104, and the subscriber station has two or more receivers 106 and 107. The hub 10 can provide an enhanced data transmission rate from the hub 10 to the subscriber 11 employing both hub transmitters 103 and 104 for reception by subscriber receivers 106 and 107. Transmitters 103, 104 and 105 and receivers 102, 106 and 107 are designed to transmit and receive using a digital transmission scheme, preferably one whose data rate can be modified based on channel conditions. For example, BPSK or a higher rate modulation scheme, including but not limited to QPSK, 16QAM, 64QAM or 256QAM may be used. Other modulation schemes, such as multilevel PSK, may be used. Also, OFDM, OFDMA, CDMA or single carrier systems can be used as a transmission system. Illustrated subscriber station 11 has single transmitter 105 and base 10 has single receiver 102. However, different architectures could be utilized to provide more receivers and transmitters at either end to provide symmetric traffic, or conversely, to make the traffic more asymmetric.

Preferably, the basic flow of data comes from network backbone 12, via connection 15 to base station 10. Customer premises equipment (CPE) 13 receives data via link 16 to subscriber station. Data from internet backbone 12 may be divided into two streams at box 101 and is re-assembled at box 108 for use by the CPE.

Multiple receivers 106 and 107 allow reception from multiple hubs at any particular instant in time. Multiple receivers allow switching to a different hub if a first hub is experiencing particularly heavy traffic or if interference conditions dictate such a switch. Also, transmissions from multiple hubs, that might be in different locations, may be received simultaneously by such multiple collocated subscriber receivers. This facilitates flexibility and an ability to decorrelate signals, which is a benefit for mitigation of deep fades or interference that may not occur simultaneously on two different receive paths from different hubs. Additionally, use of multiple receivers 106 and 107 allows switching to an alternative channel or channels for reception if conditions warrant.

As pointed out above, in a preferred embodiment of the present system there are two transmitters 103 and 104 at the base site 10. These two transmitters preferably use two different channels, F1 and F2, which have frequencies which may or may not be adjacent in the frequency spectrum.

Additionally, channels F1 and F2 may or may not have diverse polarizations. The output of the two transmitters can either be combined for output to a single antenna, or two different antennas can be used. The subscriber unit 11 has two different receivers, 106 and 107 with which to receive data. The base station may split information from the Internet backbone 12 between the two transmitters, 103 and 104. Alternatively, the data may not be split, depending on the payload either of the transmitters can handle. For example, transmitter 103 may be using a QPSK modulation scheme, which provides half the data rate that transmitter 104 would provide if utilizing 16QAM.

Accordingly, preferred more robust system 100 utilizes a lower modulation scheme on one channel, such as channel F1, to insure communication and to direct control of modulation and/or transmission coding of the other channel, F2. For example, receiver 106 may generally receive using a lower modulation scheme; it will alert receiver 107 what type of modulation and/or transmission coding will be used by transmitter 104. So if the channel conditions allow, a very high modulation scheme such as 256QAM, may be transmitted from transmitter 104 to receiver 107. Then receiver 106 can alert receiver 107 to change modulations. If interference arises in the network, the modulation scheme used by transmitter 104 may be decreased, for example down to using QPSK. Since transmitter 103 is also still using QPSK, in our example through-put of the system will still double the through-put of a single transmitter/receiver network QPSK. Since, when a change in modulation and/or transmission coding is to occur, receiver 106 alerts receiver 107 that change is going to occur, second receiver 107 is continually prepared for modulation and or coding changes. Advantageously, receivers 106 and 107 may be continuous receivers. Therefore, the design of receivers 106 and 107 do not have to be as complex as the design for a bursty receiver which would be required to make changes without the benefit of alerts.

Signal quality or metrics may be monitored at subscriber station 11. Signal metric analysis may be carried out by subscriber station 11 at box 109. A metric report transmitted from Subscriber station 11 to base station 10 may be employed by modulation control 110 to make decisions as to the modulations to be used by both control channel F1 and data channel F2. The Modulation control instructs transceivers 103 and 104 as to which modulations to use and which modulation to prepare receiver 107 to receive.

Timing can be continuously maintained on more robust channel F1. This frees higher capacity channel F2 of the need to maintain timing. The relay timing can be maintained on second receiver 107 through the first receiver 106. In addition to maintaining the timing, control and synchronization information necessary for the subscriber unit to operate can be transmitted on control channel F1. Therefore, transmitter 104 may need only transmit data bits and may not need to also transmit synchronization and control protocol bits. Thereby, reducing overhead and increasing data through-put on the data channel F2.

Figure 2:
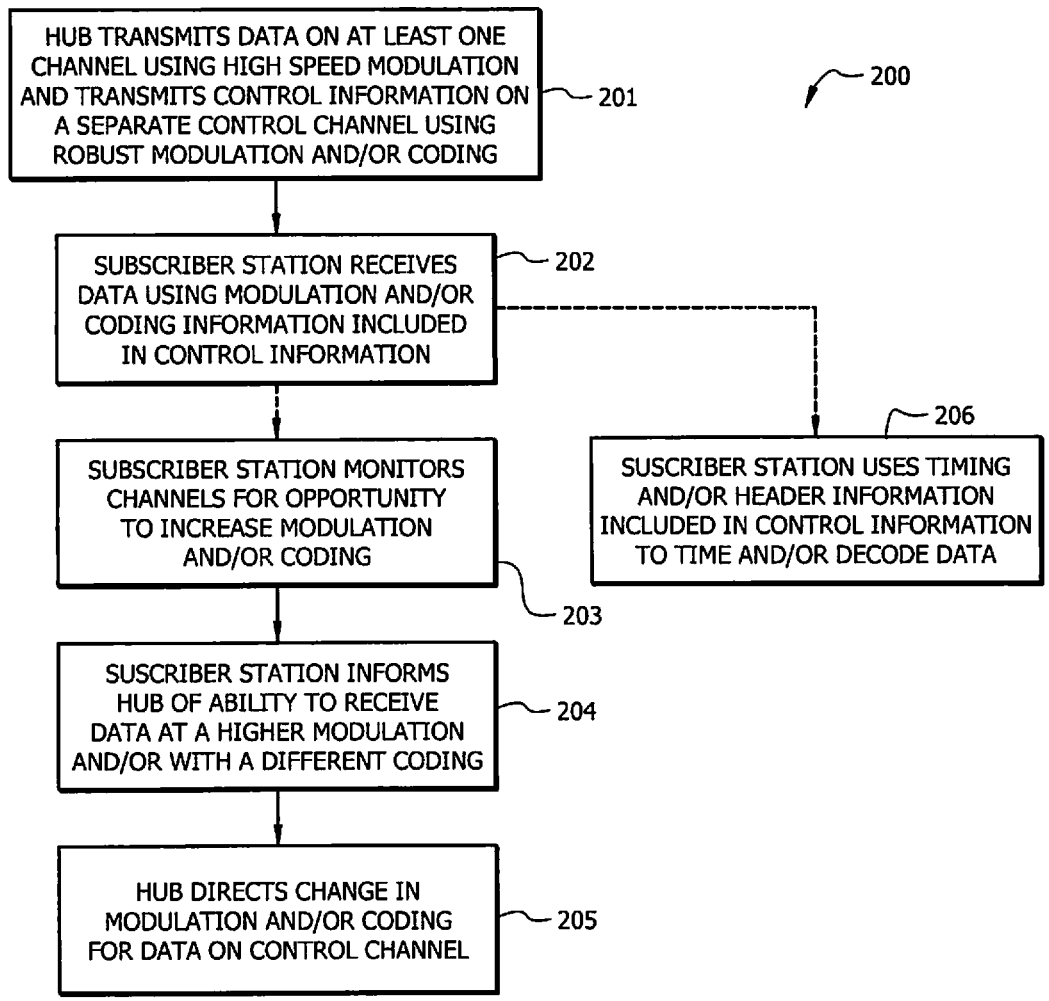
FIG. 2 is a flow chart of the present method.

With attention directed to FIG. 2, preferred method 200 of practicing the present invention is charted. At box 201 a hub preferably utilizes a lower modulation scheme on one channel, such as a control channel, to insure continuous communication and to direct control of modulation and/or coding of at least one data channel. A subscriber station preferably receives the control channel using the lower more robust modulation scheme and directs at least one other receiver as to what modulation and/or coding to employ to receive the transmitted data in response to control information transmitted on the control channel, box 202. If channel conditions allow, as monitored by the subscriber station at box 203, the subscriber station may request an increase in the modulation and/or change in the transmission coding scheme at box 204. In response the hub may direct an increase in modulation and/or coding via the control channel, at box 205. Timing for the data channel may be maintained on the more robust control channel, box 206. Additionally, or alternatively, at a box 206, control and synchronization bits required to decode the data may be included in the information transmitted on the control channel.

The bandwidth of channels F1 and F2 do not necessarily have to be the same. The present system provides flexibility by permitting the use of multiple frequencies to avoid or mitigate interference problems. Also, the present system allows the use of off-the-shelf chip sets. For example, it might be desirable to use a 20 Mhz channel bandwidth to have high data rate, but if only 10 Mhz wide channel bandwidth chip sets are available, it is advantageous to stack two of the narrower band chip sets and employ the present system and method in order to increase capacity of a system.

Generally, Internet traffic is asymmetric, that is to say, there is more traffic coming from hub site 10 to subscriber 11, than from subscriber 11 to hub 10. Therefore, in present system 100 only transmitter 105 is shown transmitting from the subscriber to receiver 102 at the hub site 10, via channel F3. Preferably, a robust modulation is used for channel F3 transmissions from the subscriber 11 to the hub 10 because a higher data rate is not generally needed in the subscriber 11 to hub 10 direction. However, present system 100 is adaptable to adopt a high capacity data transmit channel scheme in the reverse direction just as disclosed in the forward direction, if desired.

Additionally, the present system provides a degree of system back-up. If there is a hardware failure at subscriber 11, for example if receiver 107 were to become inoperable, transmissions could still take place at a lower data rate through receiver 106.

While two transmitters 103 and 104 are shown at base station 10, any number of channels and transmitters can be used. Preferably, all the data transmission channels would key off of one control channel having one modulation scheme. The other channels could have higher modulations or different modulation schemes, as desired, all controlled from one timing and control signal sent on the first channel.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication method, the method comprising:
   transmitting, from a base station, data information on at least one data channel at a first rate and control information on at least one control channel at a second rate;
   receiving, at the base station, information relating to a condition of the at least one data channel;
   determining, in response to the received information, if interference on the at least one data channel is unacceptable;
   if interference on the at least on data channel is unacceptable, transmitting, from the base station, a signal informing a subscriber station that subsequent data information will be transmitted on the at least one control channel, where the signal is transmitted on the at least one control channel prior to transmitting the subsequent data information on the at least one control channel; and
   transmitting the subsequent data information on the at least one control channel at the second rate instead of the at least one data channel.

2. The method of claim 1 wherein the second rate is less than the first rate.

3. The method of claim 1 wherein the first rate utilizes a higher modulation scheme than the second rate.

4. The method of claim 1 further comprising:
   in response to the received information, changing the second rate.

5. The method of claim 1 wherein the data information is transmitted on the at least one data channel by a first antenna and the channel information is transmitted on the at least one control channel by a second antenna.

6. The method of claim 1 wherein the at least one control channel uses a modulation scheme with a lower required carrier-to-interference ratio (C/I) than a modulation scheme used by the at least one data channel.

7. The method of claim 1 wherein the at least one data channel and the at least one control channel are on non-adjacent frequency bands.

8. A base station for wireless communication, the base station comprising:
   circuitry configured to:
       transmit data information on at least one data channel at a first rate and control information on at least one control channel at a second rate;
       receive information relating to the condition of the at least one data channel;
       determine, in response to the received information, if interference on the at least one data channel is unacceptable;
       if interference on the at least on data channel is unacceptable, transmit, from the base station, a signal informing a mobile station that subsequent data information will be transmitted on the at least one control channel, where the signal is transmitted on the at least one control channel prior to transmitting the subsequent data information on the at least one control channel; and
       transmit the subsequent data information on the at least one control channel at the second rate instead of the at least one data channel.

9. The base station of claim 8 wherein the second rate is less than the first rate.

10. The base station of claim 8 wherein the first rate utilizes a higher modulation scheme than the second rate.

11. The base station of claim 8 wherein the circuitry is further configured to:
    in response to the received information, change the second rate.

12. The base station of claim 8 wherein the circuitry is further configured to:
    transmit the data information on the at least one data channel by a first antenna and transmit the channel information on the at least one control channel by a second antenna.

13. The base station of claim 8 wherein the circuitry is further configured to:
    utilize a modulation scheme with a lower required carrier-to-interference ratio (C/I) on the at least one control channel than a modulation scheme used by the at least one data channel.

14. The base station of claim 8 wherein the at least one data channel and the at least one control channel are on non-adjacent frequency bands.

15. A wireless communication method, the method comprising:
    receiving, at a mobile station, data information on at least one data channel at a first rate and control information on at least one control channel at a second rate;
    transmitting, from the mobile station, information relating to the condition of the at least one data channel to a base station; and
    if the base station determines interference on the at least one data channel is unacceptable, receiving:
        a signal informing the mobile station that subsequent data information will be transmitted on the at least one control channel, where the signal is received on the at least one control channel prior to receiving the subsequent data information on the at least one control channel, and
        the subsequent data information on the at least one control channel at the second rate instead of the at least one data channel.

16. The method of claim 15 wherein the second rate is less than the first rate.

17. The method of claim 15 wherein the first rate utilizes a higher modulation scheme than the second rate.

18. The method of claim 15 wherein the data information is received on the at least one data channel by a first antenna and the channel information is received on the at least one control channel by a second antenna.

19. The method of claim 15 wherein the at least one control channel uses a modulation scheme with a lower required carrier-to-interference ratio (C/I) than a modulation scheme used by the at least one data channel.

20. The method of claim 15 wherein the at least one data channel and the at least one control channel are on non-adjacent frequency bands.

21. A mobile station for wireless communication, the mobile station comprising:
    circuitry configured to:
        receive data information on at least one data channel at a first rate and control information on at least one control channel at a second rate transmitted from a base station;
        transmit information relating to the condition of the at least one data channel to the base station; and
        if the base station determines interference on the at least one data channel is unacceptable, receive:
            a signal informing the mobile station that subsequent data information will be transmitted on the at least one control channel, where the signal is received on the at least one control channel prior to receiving the subsequent data information on the at least one control channel, and the subsequent data information on the at least one control channel at the second rate instead of the at least one data channel.

22. The mobile station of claim 21 wherein the second rate is less than the first rate.

23. The mobile station of claim 21 wherein the first rate utilizes a higher modulation scheme than the second rate.

24. The mobile station of claim 21 wherein the circuitry is further configured to:

receive data information on the at least one data channel by a first antenna and receive the channel information on the at least one control channel by a second antenna.

25. The mobile station of claim 21 wherein the at least one control channel uses a modulation scheme with a lower required carrier-to-interference ratio (C/I) than a modulation scheme used by the at least one data channel.

26. The mobile station of claim 21 wherein the at least one data channel and the at least one control channel are on non-adjacent frequency bands.

* * * * *